United States Patent
Hofer et al.

(10) Patent No.: US 10,175,672 B2
(45) Date of Patent: Jan. 8, 2019

(54) CONTROL SYSTEM FOR TURBOMACHINE COMPLEX AND METHOD OF OPERATING THE SAME

(71) Applicant: General Electric Company, Schenectady, NY (US)

(72) Inventors: Douglas Carl Hofer, Clifton Park, NY (US); Matthew Alexander Lehar, Bavaria (DE)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 391 days.

(21) Appl. No.: 14/954,396

(22) Filed: Nov. 30, 2015

(65) Prior Publication Data

US 2017/0152755 A1    Jun. 1, 2017

(51) Int. Cl.
| | | |
|---|---|---|
| G05D 3/12 | (2006.01) |
| G05B 19/05 | (2006.01) |
| F01D 19/00 | (2006.01) |
| F01D 21/00 | (2006.01) |
| F02C 7/275 | (2006.01) |

(Continued)

(52) U.S. Cl.
CPC ............. *G05B 19/05* (2013.01); *F01D 19/00* (2013.01); *F01D 21/00* (2013.01); *F02C 7/275* (2013.01); *F02C 9/00* (2013.01); *F02C 9/28* (2013.01); *F05D 2220/76* (2013.01); *F05D 2260/85* (2013.01); *F05D 2270/024* (2013.01); *F05D 2270/304* (2013.01); *G05B 2219/1203* (2013.01)

(58) Field of Classification Search
CPC ........ F04D 21/00; F04D 29/284; F04D 17/02; F04D 17/127; F04D 19/024; F04D 29/624; F04D 29/441; F04D 17/12; F04D 29/053; F04D 29/321; F04D 29/44; F04D 29/644; F04D 17/08; F04D 17/10
See application file for complete search history.

(56) References Cited

U.S. PATENT DOCUMENTS

| | | |
|---|---|---|
| 4,958,708 A | 9/1990 | Kawamura |
| 5,076,755 A | 12/1991 | Okada |
| 5,088,286 A | 2/1992 | Muraji |

(Continued)

FOREIGN PATENT DOCUMENTS

| | | |
|---|---|---|
| EP | 1553275 A2 | 7/2005 |
| JP | 1121516 A | 5/1989 |

OTHER PUBLICATIONS

International Search Report and Written Opinion issued in connection with corresponding Application No. PCT/US2016/059811 dated Jan. 30, 2017.

(Continued)

*Primary Examiner* — Robert Bachner
(74) *Attorney, Agent, or Firm* — GE Global Patent Operation; Marc A. Vivenzio (57) ABSTRACT

A turbomachine complex includes at least one motor-generator, at least one power source coupled to the at least one motor-generator, and at least one load dissipative device coupled to the at least one motor-generator. The turbomachine complex is configured to energize the at least one motor-generator through the at least one power source. The turbomachine complex is further configured to simultaneously energize the at least one at least one load dissipative device through the at least one motor-generator.

17 Claims, 5 Drawing Sheets

(51) Int. Cl.
*F02C 9/00* (2006.01)
*F02C 9/28* (2006.01)

(56) References Cited

U.S. PATENT DOCUMENTS

| | | |
|---|---|---|
| 5,678,407 A | 10/1997 | Hara |
| 6,705,084 B2 | 3/2004 | Allen et al. |
| 8,459,029 B2 | 6/2013 | Lehar |
| 8,752,382 B2 | 6/2014 | Lehar |
| 8,813,494 B2 | 8/2014 | Hofer et al. |
| 2003/0052485 A1* | 3/2003 | Poteet .................... F01D 15/10 290/4 R |
| 2003/0111842 A1 | 6/2003 | Gilbreth et al. |
| 2013/0199184 A1 | 8/2013 | Lehar |
| 2013/0340429 A1 | 12/2013 | Desai et al. |
| 2014/0208745 A1 | 7/2014 | Suhocki et al. |

OTHER PUBLICATIONS

Ouenou-Gamo et al., "A nonlinear controller of a turbocharged diesel engine using sliding mode", Control Applications, 1997., Proceedings of the 1997 IEEE International Conference on, IEEE Xplore, pp. 803-805, Oct. 5-7, 1997, Conference Location : Hartford, CT, USA.

\* cited by examiner

CONTROL SYSTEM FOR TURBOMACHINE COMPLEX AND METHOD OF OPERATING THE SAME

BACKGROUND

The field of the disclosure relates generally to turbomachine complexes, and, more specifically, to control systems for operating turbomachine complexes for power generation.

Known turbomachine complexes contain a common shaft to which the rotors of the compressor, the turbine, and the electrical machine, i.e., motor-generator are coupled. Such known turbomachine complexes for electrical power generation are constrained to rotate at the same speed. In known control schemes for such known turbomachine complexes, the electrical machine is coupled to an electrical power source and is run as a motor during startup. In such known control schemes, the power drawn from the power source drops as the torque produced by the turbine increases in order to maintain shaft speed during startup. After the power drawn from the power source drops to zero, the shaft begins to accelerate until it reaches a slightly higher speed, which the control system uses as a cue to begin applying an electrical load to the shaft from the load bank. This action immediately reduces the speed of the turbine, and consequently the speed of the compressor as well, because they are linked together by the common shaft. As the compressor decelerates, the corresponding drop in pressure at the compressor outlet (and turbine inlet) reduces the torque supplied to the shaft by the turbine, further decreasing the shaft speed, until the control system again switches on the motor. This restarts the process, so that a forced, permanent oscillation is oftentimes established, and the system may require manual intervention by the operator to achieve a pure generating mode.

Also, in such known control schemes, as heat is added to the system over time, pressure built up by the compressor leads to the electrical machine generating more power than supplied by the power supply on account of the turbine coming up to speed on the shaft. In such known control schemes, the electrical machine is switched from operating as a motor to operating as a generator in order for an electrical load to absorb excess power from the shaft. During this transitional state of such known turbomachine complexes, oscillations in the system may commence and manual intervention by the operator will be required to reliably achieve the pure generation mode. Further, in such known control schemes for known turbocompressor complexes used for power generation, the aforementioned oscillation is oftentimes especially burdensome during operation of turbomachine heat cycles utilizing lighter weight turbocompressors with less mechanical inertia, including, for example, those developed for carbon dioxide-based cycles. The problematic oscillations oftentimes leads to decreasing compressor speed along with decreasing pressure of the working fluid, thereby requiring the power supply to power the electrical machine as a motor in order to boost the pressure. In such known turbomachine complexes, alternate cycling between the electrical machine operating as a motor and as a generator may prevent reliable generation of electrical power.

BRIEF DESCRIPTION

In one aspect, a turbomachine complex is provided. The turbomachine complex includes at least one motor-generator, at least one power source coupled to the motor-generator, and at least one load dissipative device coupled to the at least one motor-generator. The turbomachine complex is configured to energize the at least one motor-generator through the at least one power source. The turbomachine complex further is configured to simultaneously energize the at least one load dissipative device through the at least one motor-generator.

In another aspect, a method of operating a turbomachine complex is provided. The turbomachine complex includes at least one motor-generator. The method includes coupling at least one power source and at least one load dissipative device to the at least one motor-generator. The method also includes energizing the at least one motor-generator through the at least one power source, and simultaneously energizing the at least one load dissipative device through the at least one motor-generator.

DRAWINGS

These and other features, aspects, and advantages of the present disclosure will become better understood when the following detailed description is read with reference to the accompanying drawings in which like characters represent like parts throughout the drawings, wherein.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, and such ranges are identified and include all the sub-ranges contained therein unless context or language indicates otherwise.

As used herein, the terms "processor" and "computer" and related terms, e.g., "processing device", "computing device", and "controller" are not limited to just those integrated circuits referred to in the art as a computer, but broadly refers to a microcontroller, a microcomputer, a programmable logic controller (PLC), an application specific integrated circuit (AISC), and other programmable circuits, and these terms are used interchangeably herein. In the embodiments described herein, memory may include, but is not limited to, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Furthermore, as used herein, the term "real-time" refers to at least one of the time of occurrence of the associated events, the time of measurement and collection of predetermined data, the time to process the data, and the time of a system response to the events and the environment. In the embodiments described herein, these activities and events occur substantially instantaneously.

The turbomachine complexes and associated control systems and methods described herein are suited to smooth the transition of motor-generators of turbomachines from motor operation to generator operation. The turbomachine complexes and associated control systems and methods described herein are also suited to smooth the transition of motor-generators of turbomachines from generator operation to motor operation. Also, the turbomachine complexes and associated control systems and methods described herein effectively prevent establishment of problematic forced oscillations in turbomachine systems resulting from the motor-generator transitioning to and from operation as a motor and as a generator. Further, the turbomachine complexes and associated control systems and methods described herein effectively prevent decreasing compressor and working fluid pressure during the aforementioned transition states of motor-generators in turbomachine complexes used for power generation. Furthermore, the turbomachine complexes and associated control systems and methods described herein facilitate faster transitioning to and from motor operation and generator operation of motor-generators of turbomachine complexes. Moreover, the turbomachine complexes and associated control systems and methods described herein facilitate more effective and efficient utilization of lighter weight turbocompressors with less mechanical inertia in turbomachine complexes for electricity generation applications.

Figure 1:
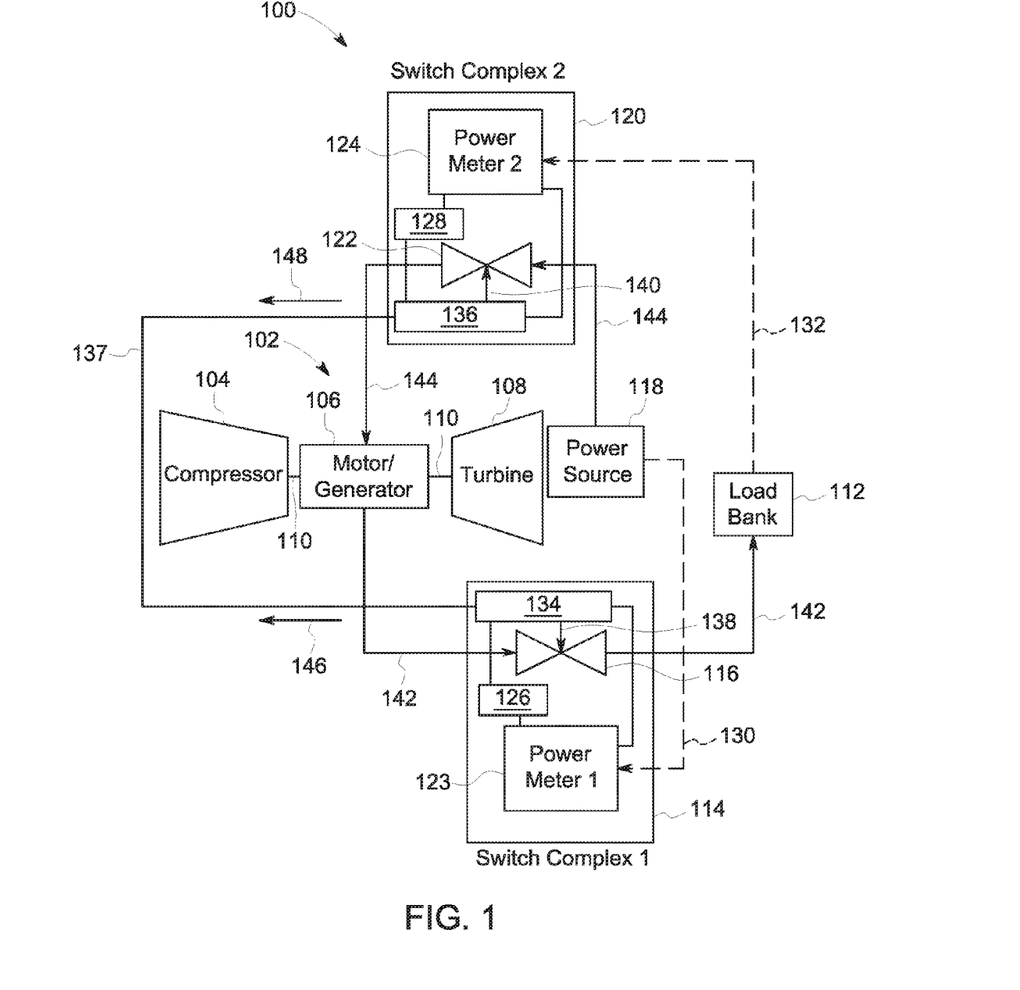
FIG. 1 is a schematic diagram of an exemplary turbomachine control system for controlling a turbomachine complex.

FIG. 1 is a schematic diagram of an exemplary turbomachine control system 100 for controlling a turbomachine complex 102. In the exemplary embodiment, turbomachine complex 102 includes at least one compressor 104 (only one shown), at least one motor-generator 106 (only one shown), and at least one turbine 108 (only one shown). Compressor 104, motor-generator 106, and turbine 108 are rotatably coupled by at least one shaft 110 (only one shown). In other alternative embodiments, not shown, compressor 104, motor-generator 106, and turbine 108 are further rotatably coupled through at least one gearbox facilitating compressor 104, motor-generator 106, and turbine 108 to rotate at different speeds but always in the same ratio. Turbine 108 is configured as a drive engine for motor-generator 106. Compressor 104 is configured to supply an amount of compressed gas, i.e., air, to turbine 108. Motor-generator 106 is configured to function as either a motor or a generator. Turbomachine control system 100 includes at least one load dissipative device 112 (only one shown) including, without limitation, a load bank, and at least one first switch complex 114 (only one shown) including at least one first switch 116 (only one shown) coupled to and between load dissipative device 112 and motor-generator 106. Turbomachine control system 100 also includes at least one power source 118 (only one shown), including, without limitation, an AC power supply and a DC power supply with or without an inverter, and at least one second switch complex 120 (only one shown). Second switch complex includes at least one second switch 122 (only one shown) coupled to and between power source 118 and motor-generator 106.

Also, in the exemplary embodiment, first switch complex 114 and second switch complex 120 each include, respectively, at least one first measuring device 123 (only one shown) coupled to power source 118, and at least one second measuring device 124 (only one shown) coupled to load dissipative device 112. First switch complex 114 also includes at least one first computer-readable media 126 (only one shown) coupled to first measuring device 123. Second switch complex 120 also includes at least one second computer-readable media 128 (only one shown) coupled to second measuring device 124. First measuring device 123 is configured to acquire at least one first measurement 130 (only one shown) of at least one first measurand associated with power source 118. Second measuring device 124 is configured to acquire at least one second measurement 132 (only one shown) of at least one second measurand associated with load dissipative device 112.

Further, in the exemplary embodiment, first measuring device 123 is further configured to store a value of first measurement 130 in first computer-readable media 126. Second measuring device 124 is further configured to store a value of second measurement 132 in second computer-readable media 128. Furthermore, in the exemplary embodiment, first switch complex 114 is configured to receive and store at least one user-defined value of at least one of at least one first set point value and at least one second set point value as data in at least one of first computer-readable media 126 and second computer-readable media 128. Similarly, second switch complex 120 is configured to receive and store at least one user-defined value of at least one of first set point value and second set point value in at least one of first computer-readable media 126 and second computer-readable media 128. First set point value includes, without limitation, a value of an electrical power drawn from power source 118 by motor-generator 106. Second set point value includes, without limitation, a value of an electrical power drawn by load dissipative device 112 from motor-generator 106.

Furthermore, in the exemplary embodiment, first switch complex 114 includes at least one first controller 134 (only one shown) coupled to and between first switch 116 and first computer-readable media 126. Likewise, second switch complex 120 includes at least one second controller 136 (only one shown) coupled to and between second switch 122 and second computer-readable media 128. First controller 134 and second controller 136 are coupled together with at least one data line 137 (only one shown) including, without limitation, a two-way data communication line. Data line 137 is configured to facilitate real-time transfer of information, including, without limitation, numerical data and operations encoded as computer executable instructions, to and between first controller 134 and second controller 136. In other alternative embodiments, not shown, turbomachine control system 100 does not include data line 137. In still other alternative embodiments, not shown, data line 137 is replaced with a means for wireless data transmission.

Moreover, in the exemplary embodiment, first controller 134 is configured to compare the value of first measurement 130 with the value of first set point. First controller 134 is further configured to transmit at least one first switch control signal 138 (only one shown) to first switch 116 to open first switch 116 when first measurement 130 has a first predetermined value and close first switch 116 when first measurement 130 has a second predetermined value different from the first predetermined value. Also, in the exemplary embodiment, second controller 136 is configured to compare the value of second measurement 132 with the value of second set point. Second controller 136 is further configured to transmit at least one second switch control signal 140 (only one shown) to second switch 122 to open second switch 122 when second measurement 132 has a first predetermined value and close second switch 122 when second measurement 132 has a second predetermined value different from the first predetermined value. Further, in the exemplary embodiment, first controller 134 is configured to transmit at least one first cross-controller signal 146 (only one shown) to second controller 136. Similarly, second controller 136 is configured to transmit at least one second cross-controller signal 148 (only one shown) to first controller 134. In other alternative embodiments, not shown, first switch complex 114 and second switch complex 120, respectively, do not contain first and second computer-readable media (126, 128) and first and second controllers (134, 136). Rather, in those alternative embodiments, turbomachine control system 100 is implemented as an analog, rather than digital control system which reacts directly to at least one of first measurement 130 and second measurement 132 without first storing them as data in at least one computer-readable media and/or carrying out operations encoded as computer executable instructions.

In operation, in the exemplary embodiment, first switch complex 114 alternately opens and closes first switch 116 to control, i.e., alternately allow and disallow, transmitting a first regulated electrical power flow 142 from motor-generator 106 to load dissipative device 112. Likewise, second switch complex 120 alternately opens and closes second switch 122 to control, i.e., alternately allow and disallow, transmitting a second regulated electrical power flow 144 from power source 118 to motor-generator 106. Also, in operation of the exemplary embodiment, power source 118 facilitates motor-generator 106 operation as a motor when second switch 122 is closed. Likewise, load dissipative device 112 facilitates motor-generator 106 operation as a generator when first switch 116 is closed. Further, in operation of the exemplary embodiment, when both first switch 116 and second switch 122 are closed, the overall balance of electrical power being transmitted in first regulated electrical power flow 142 and second regulated electrical power flow 144 between motor-generator 106, power source 118, and load dissipative device 112 will be maintained. As such, in operation of the exemplary embodiment, motor-generator 106 will operate as one of a motor or a generator at any given time. Motor-generator 106 operates as a motor to rotate shaft 110 via electrical power supplied to it by power source 118. As turbine 108 increases the torque applied to shaft 110 beyond that which motor-generator 106 applies as a motor, motor-generator 106 generates an excess amount of electrical power as a generator. Therefore, the excess amount of generated electrical power is dissipated in load dissipative device 112 by closing first switch 116. Depending on the magnitude of the power added from power source 118 and subtracted by load dissipative device 112, motor-generator 106 will make up the difference either by operating as a motor or a generator.

Also, in operation of the exemplary embodiment, first measuring device 123 acquires first measurement 130 of at least one measurand associated with power source 118 and stores first measurement 130 as data in at least one of first computer-readable media 126 and second computer-readable media 128. First measurand includes electrical parameters associated with power source 118 including, without limitation, at least one of a current, a voltage, a resistance, an impedance, a frequency, a phase, and a power associated with power source 118. Second measuring device 124 acquires second measurement 132 of at least one measurand associated with load dissipative device 112 and stores second measurement 132 as data in at least one of first computer-readable media 126 and second computer-readable media 128. Second measurand includes electrical parameters associated with load dissipative device 112 including, without limitation, at least one of a current, a voltage, a resistance, an impedance, a frequency, a phase, and a power associated with load dissipative device 112.

Further, in operation of the exemplary embodiment, first computer-readable media 126 and second computer-readable media 128 store at least one user-defined value of at least one of first set point and second set point, respectively, as data in at least one of first computer-readable media 126 and second computer-readable media 128. First controller 134 compares, in real-time, first measurement 130 with first set point, including, without limitation, through programmed software algorithms and instructions stored in at least one of first computer-readable media 126 and first controller 134. Second controller 136 compares, in real-time, second measurement 132 with second set point, including, without limitation, through programmed software algorithms and instructions stored in at least one of second computer-readable media 128 and second controller 136. Furthermore, in the exemplary embodiment, through real-time communication of information, i.e., numerical data, through data line 137, it is possible for first controller 134 to use the value of second measurement 132 stored in second computer-readable media 128 during real-time comparison operations performed by first controller 134. Likewise, by way of real-time data communication through data line 137, it is possible for second controller 136 to use the value of first measurement 130 stored in first computer-readable media 126 during real-time comparison operations performed by second controller 136.

Furthermore, in operation of the exemplary embodiment, first controller 134 transmits first control signal 138 to first switch 116 to open first switch 116 when at least one of first measurement 130 and second measurement 132 has a first predetermined value and close first switch 116 when at least one of first measurement 130 and second measurement 132 has a second predetermined value different from the first predetermined value. Similarly, second controller 136 transmits second switch control signal 140 to second switch 122 to open second switch 122 when at least one of first measurement 130 and second measurement 132 has a first predetermined value and close second switch 122 when at least one of first measurement 130 and second measurement 132 has a second predetermined value different from the first predetermined value.

Moreover, in operation of the exemplary embodiment, a result of the aforementioned comparison performed by first controller 134 is used to direct second controller 136 to alternately open and close second switch 122 after first controller 134 transmits first cross-controller signal 146 to second controller 136 on data line 137. Likewise, a result of the aforementioned comparison performed by second controller 136 is used to direct first controller 134 to alternately open and close first switch 116 after second controller 136 transmits second cross-controller signal 148 to second controller 136 on data line 137. As such, in operation of the exemplary embodiment, when first switch 116 is closed, load dissipative device 112 dissipates excess electrical power from motor-generator 106 when motor-generator 106 is operating as a generator. Likewise, power source 118 supplies electrical power to motor-generator 106 to facilitate operation of motor-generator 106 as a motor when second switch 122 is closed.

Figure 2:
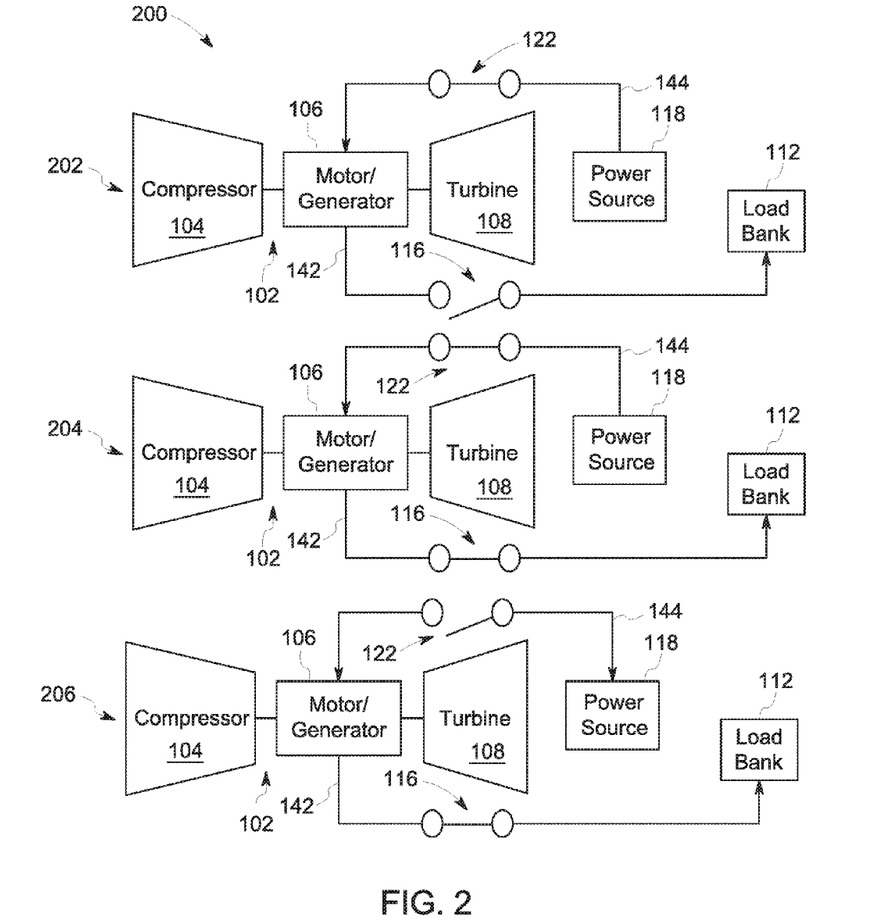
FIG. 2 is a schematic diagram of an exemplary control scheme for a turbomachine complex which may be used with the turbomachine control system shown in FIG. 1.

FIG. 2 is a schematic diagram of an exemplary control scheme 200 for a turbomachine complex 102 which may be used with the turbomachine control system 100 shown in FIG. 1. In the exemplary embodiment, control scheme 200 includes at least three operational states, i.e., modes, for turbomachine complex 102: motoring mode 202, transitioning mode 204, and generating mode 206. Also, in the exemplary embodiment, motoring mode 202 includes first switch 116 in an open position such that first regulated electrical power flow 142 does not flow from motor-generator 106 to load dissipative device 112. Motoring mode 202 also includes second switch 122 in a closed position such that power source 118 provides second regulated electrical power flow 144 to motor-generator 106 to facilitate its operation as a motor.

Also, in the exemplary embodiment, transitioning mode 204 includes first switch 116 in a closed position such that first regulated electrical power flow 142 is permitted to flow, if needed, from motor-generator 106 to load dissipative device 112 to facilitate operation of motor-generator 106 as a generator. Transitioning mode 204 also includes second switch 122 in a closed position such second regulated electrical power flow 144 is permitted to flow, if needed, from power source 118 to motor-generator 106 to facilitate operation of motor-generator 106 as a motor. As such, the closing both of first switch 116 and second switch 122 during transitioning mode 204 facilitates operation of motor-generator 106 as either a motor or a generator at any given time, as described above with reference to FIG. 1. Further, in the exemplary embodiment, generating mode 206 includes first switch 116 in a closed position such that first regulated electrical power flow 142 flows from motor-generator 106 to load dissipative device 112 to facilitate operation of motor-generator 106 as a generator. Generating mode 206 also includes second switch 122 in an open position such that power source 118 does not provide second regulated electrical power flow 144 to motor-generator 106, thus preventing operation of motor-generator 106 as a motor.

In operation, in the exemplary embodiment, before turbomachine complex 102 enters generating mode 206 from motoring mode 202, transitioning mode 204 is entered. Also, in operation of the exemplary embodiment, as turbomachine complex 102 proceeds from motoring mode 202 through transitioning mode 204 and then on to generating mode 206, the torque applied to shaft 110 is ever increasing until a predetermined, i.e., rated, shaft rotational velocity and torque is reached. As described in detail above with reference to FIG. 1, the alternate opening and closing of first switch 116 and second switch 122 effects control scheme 200 directing turbomachine complex 102 proceeding from motoring mode 202 through transitioning mode 204 and then on to generating mode 206. As such, in operation of the exemplary embodiment, entering transitioning mode 204 in control scheme 200 prevents undesirable oscillations, including, without limitation, mechanical and electrical oscillations and resonances, from occurring in turbomachine complex 102 while motor-generator 106 proceeds from operating as a motor to operating as a generator. Also, in operation of the exemplary embodiment, when second switch is closed, turbomachine complex 102 is configured to energize motor-generator 106 through power source 118. Further, in operation of the exemplary embodiment, when both first switch 116 and second switch 122 are closed, turbomachine complex 102 is further configured to simultaneously energize both of load dissipative device 112 through motor-generator 106 and motor-generator 106 through power source 118.

Figure 3:
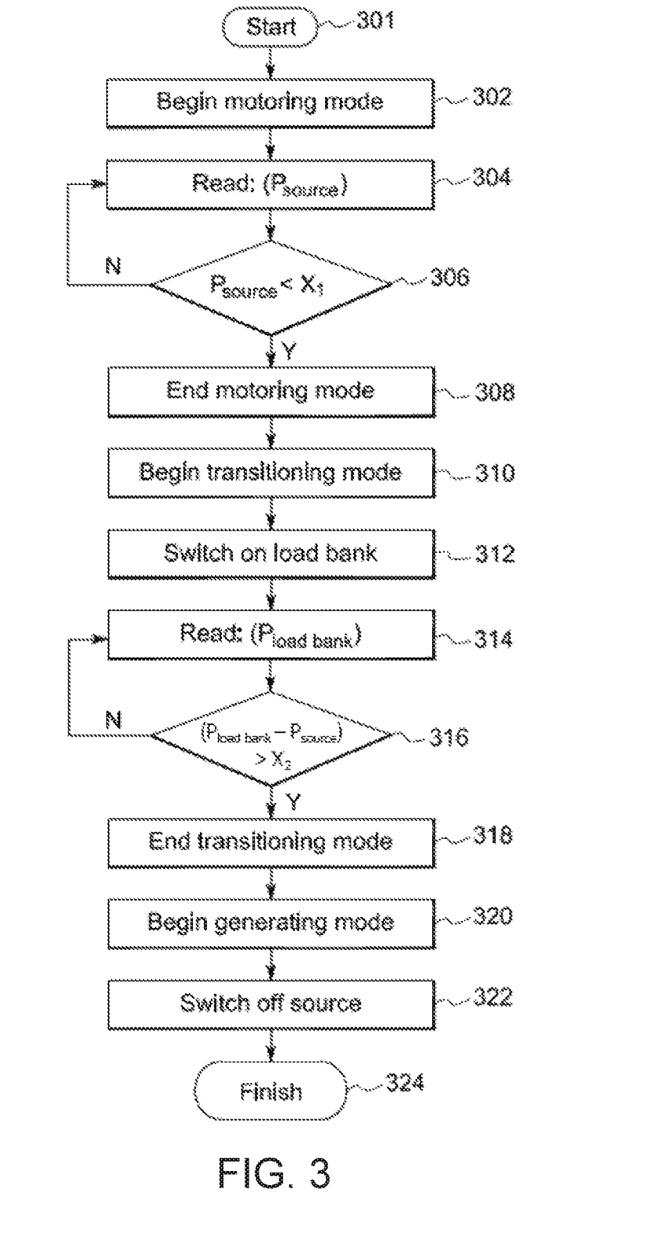
FIG. 3 is a flowchart diagram of an exemplary method of controlling a turbomachine complex which may be used with the control scheme shown in FIG. 2.

FIG. 3 is a flowchart diagram of an exemplary method 300 of controlling a turbomachine complex 102 which may be used with the control scheme 200 shown in FIG. 2. In the exemplary embodiment, method 300 includes a "start" state 301 including, without limitation, a state at which shaft 110 has zero rotational velocity, as would be the case during a state of shutdown of turbomachine complex 102, not shown. Also, in the exemplary embodiment, method 300 includes a step 302 during which method 300 proceeds from start state 301 to beginning motoring mode 202, and a flag indicating such is stored as data in at least one of first controller 134 and second controller 136. Step 302 includes opening first switch 116 and closing second switch 122. During step 302, the rotational velocity of shaft 110 of turbomachine complex 102, not shown, increases in magnitude on account of a torque applied to shaft 110 by motor-generator 106 operating as a motor. Further, in the exemplary embodiment, method 300 includes a step 304 during which first measuring device 123 acquires first measurement 130 including, without limitation, the value of electric power drawn from power source 118 by motor-generator 106, i.e., $P_{source}$, and stores first measurement 130 as data in at least one of first computer-readable media 126 and second computer-readable media 128.

Also, in the exemplary embodiment, method 300 includes a step 306, during which at least one of first controller 134 and second controller 136 compares first measurement 130 with first set point value, i.e., $X_1$, for electrical power drawn by motor-generator 106 from power source 118, i.e., $P_{source}$. Prior to step 306, at least one user-defined value of $X_1$ is stored as data in at least one of first computer-readable media 126 and second computer-readable media 128. Also during step 306, a result of comparing first measurement 130 with $X_1$ facilitates a determination by at least one of first controller 134 and second controller 136 as to whether or not turbomachine complex 102 shall remain in motoring mode 202. Further, in the exemplary embodiment, if first measurement 130 is not less than $X_1$, then turbomachine complex 102 remains in motoring mode 202 and method 300 loops between step 304 and step 306.

Further, in the exemplary embodiment, if first measurement 130 is less than $X_1$, then method 300 moves to a step 308, during which motoring mode 202 is ended and a flag indicating such is stored as data by at least one of first controller 134 and second controller 136. After step 308, method 300 moves to a step 310, during which turbomachine complex 102 enters transitioning mode 204 and a flag indicating such is stored as data by at least one of first controller 134 and second controller 136. Method 300 then moves to a step 312, during which first switch 116 is closed. Furthermore, in the exemplary embodiment, method 300 includes a step 314, during which second measuring device 124 acquires second measurement 132 including, without limitation, the value of electric power drawn by load dissipative device 112 from motor-generator 106, i.e., $P_{load\ bank}$, and stores second measurement 132 as data in at least one of first computer-readable media 126 and second computer-readable media 128.

Furthermore, in the exemplary embodiment, method 300 includes a step 316, during which at least one of first controller 134 and second controller 136 subtracts first measurement 130 from second measurement 132, then compares a result thereof, i.e., $(P_{load\ bank}-P_{source})$, with second set point value, i.e., $X_2$. $X_2$ is a user-defined, i.e., predetermined, value of electrical power drawn by load dissipative device 112 from motor-generator 106, i.e., $P_{load\ bank}$. Prior to step 316, $X_2$ is stored as data in at least one of first computer-readable media 126 and second computer-readable media 128. Also during step 316, the result of comparing $(P_{load\ bank}-P_{source})$ with $X_2$ facilitates a determination by at least one of first controller 134 and second controller 136 as to whether or not turbomachine complex 102 shall remain in transitioning mode 204. Further, in the exemplary embodiment, if $(P_{load\ bank}-P_{source})$ is not greater than $X_2$, then turbomachine complex 102 remains in transitioning mode 204 and method 300 loops between step 314 and step 316.

Moreover, in the exemplary embodiment, if $(P_{load\ bank}-P_{source})$ is greater than $X_2$, then method 300 moves to a step 318, during which transitioning mode 204 is ended and a flag indicating such is stored as data in at least one of first controller 134 and second controller 136. After step 318, method 300 moves to a step 320, during which turbomachine complex 102 enters generating mode 206 and a flag indicating such is stored as data in at least one of first controller 134 and second controller 136. Method 300 then moves to a step 322, during which second switch 122 is opened. In other alternative embodiments, step 322 further includes clearing all flags stored as data by at least one of first controller 134 and second controller 136. After completing step 322, method 300 enters a "finish" state 324 during which method 300 is completed. "Finish" state 324 includes, without limitation, a state at which shaft 110 has reached a steady-state rotational velocity, as would be the case during stable operation of motor-generator 106 in turbomachine complex 102 solely as a generator. In still other alternative embodiments, method 300 includes additional method steps for a motor controller, not shown, to attain and maintain a set point speed for motor-generator 106 operating as a motor during motoring mode 202. In those other alternative embodiments, motor controller, including, without limitation, second controller 136, adjusts a power flow to motor-generator 106 operating as a motor to maintain the set point speed. Further, in those other alternative embodiments, it is possible for method 300 to measure, i.e., read, and react to other turbomachine complex 102 control parameters, including, without limitation, turbine cycle parameters such as turbine inlet temperature, that affect the power generated by the turbine during generating mode 206.

Figure 4:
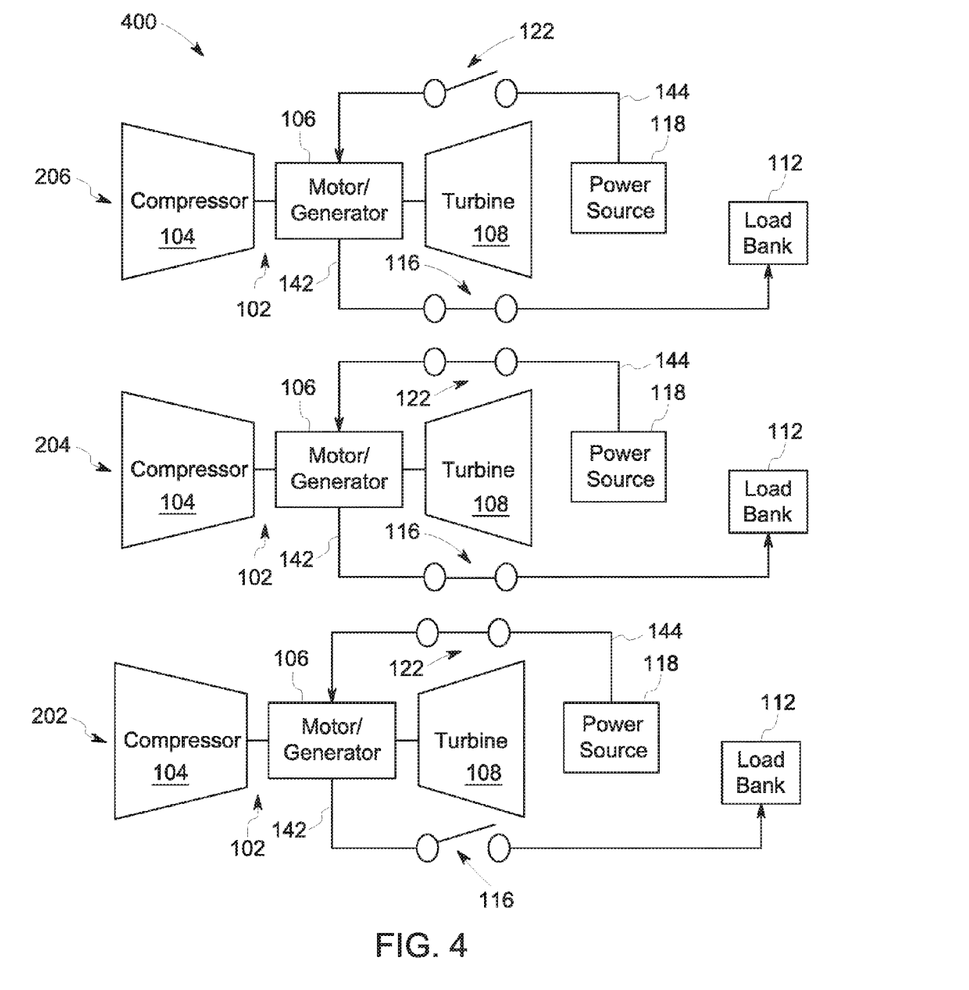
FIG. 4 is a schematic diagram of an alternative control scheme for a turbomachine complex which may be used with the turbomachine control system shown in FIG. 1.

FIG. 4 is a schematic diagram of an alternative control scheme 400 for a turbomachine complex 102 which may be used with the turbomachine control system 100 shown in FIG. 1. In the alternative embodiment, control scheme 400 includes at least three operational states, i.e., modes, for turbomachine complex 102: generating mode 206, transitioning mode 204, and motoring mode 202. Also, in the alternative embodiment, generating mode 206 includes first switch 116 in a closed position such that first regulated electrical power flow 142 flows from motor-generator 106 to load dissipative device 112 to facilitate operation of motor-generator 106 as a generator. Generating mode 206 also includes second switch 122 in an open position such that power source 118 does not provide second regulated electrical power flow 144 to motor-generator 106, thus preventing operation of motor-generator 106 as a motor.

Also, in the alternative embodiment, transitioning mode 204 includes first switch 116 in a closed position such that first regulated electrical power flow 142 flows from motor-generator 106 to load dissipative device 112 to facilitate operation of motor-generator 106 as a generator. Transitioning mode 204 also includes second switch 122 in a closed position such that power source 118 provides second regulated electrical power flow 144 to motor-generator 106 to facilitate its operation as a motor. Further, in the exemplary embodiment, motoring mode 202 includes first switch 116 in an open position such that first regulated electrical power flow 142 does not flow from motor-generator 106 to load dissipative device 112. Motoring mode 202 also includes second switch 122 in a closed position such that power source 118 provides second regulated electrical power flow 144 to motor-generator 106 to facilitate its operation as a motor.

In operation, in the alternative embodiment, before turbomachine complex 102 enters motoring mode 202 from generating mode 206, transitioning mode 204 is entered. Also, in operation of the alternative embodiment, as turbomachine complex 102 proceeds from generating mode 206 through transitioning mode 204 and then on to motoring mode 202, the torque applied by turbine 108 to shaft 110, not shown, is ever decreasing until turbine 108 no longer supplies sufficient torque to rotate turbomachine complex 102 at the desired speed. As described in detail above with reference to FIG. 1, the alternate opening and closing of first switch 116 and second switch 122 effects control scheme 400 directing turbomachine complex 102 proceeding from generating mode 206 through transitioning mode 204 and then on to motoring mode 202. As such, in operation of the alternative embodiment, entering transitioning mode 204 in control scheme 400 prevents undesirable oscillations, including, without limitation, mechanical and electrical oscillations and resonances, from occurring in turbomachine complex 102 while motor-generator 106 proceeds from operating as a generator to operating as a motor. Also, in operation of the alternative embodiment, when second switch is closed, turbomachine complex 102 is configured to energize motor-generator 106 through power source 118. Further, in operation of the alternative embodiment, when both first switch 116 and second switch 122 are closed, turbomachine complex 102 is further configured to simultaneously energize both of load dissipative device 112 through motor-generator 106 and motor-generator 106 through power source 118.

Figure 5:
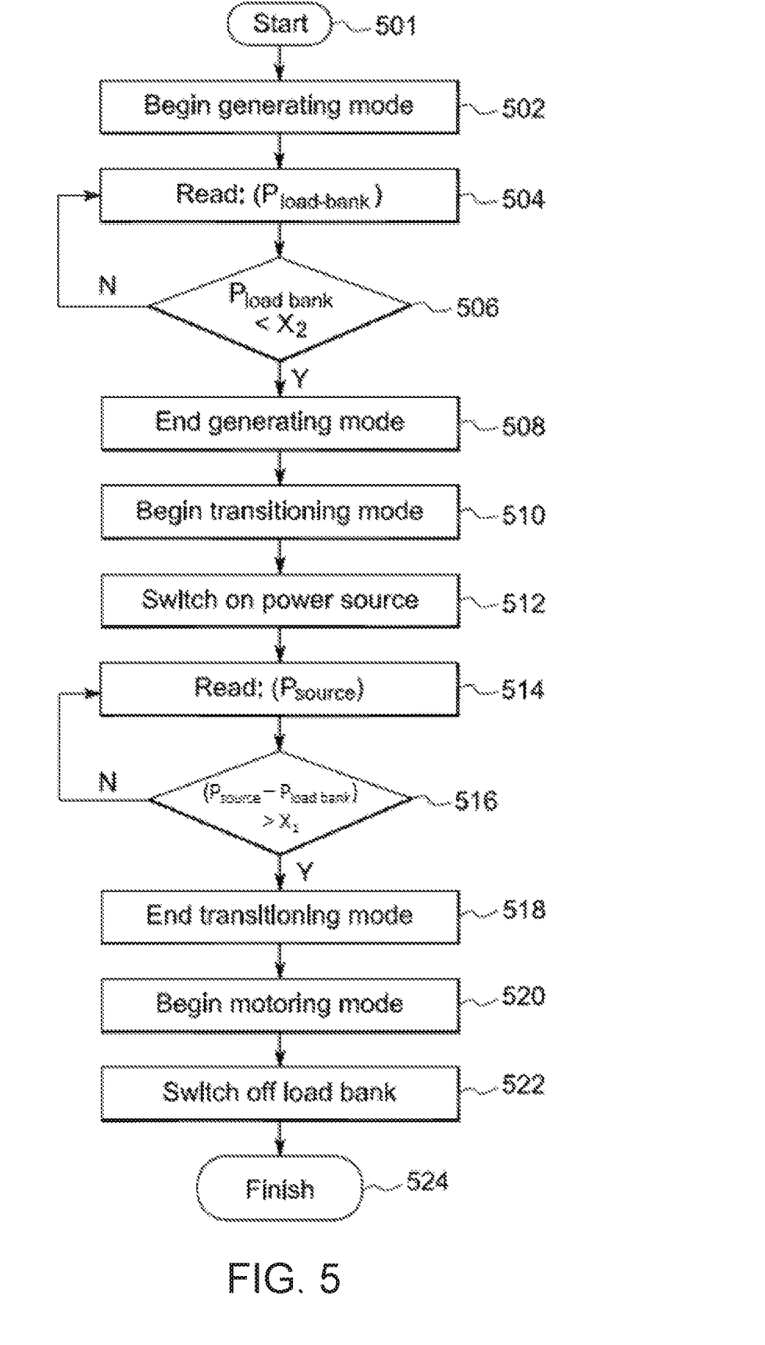
FIG. 5 is a flowchart diagram of an alternative method of controlling a turbomachine complex which may be used with the control scheme shown in FIG. 4.

FIG. 5 is a flowchart diagram of an alternative method 500 of controlling a turbomachine complex 102 which may be used with the control scheme 400 shown in FIG. 4. In the alternative embodiment, method 500 includes a "start" state 501 including, without limitation, a state at which shaft 110 is rotating at a steady-state rotational velocity, as would be the case during stable operation of motor-generator 106 in turbomachine complex 102 solely as a generator. Also, in the alternative embodiment, method 500 includes a step 502 during which method 500 proceeds from start to beginning generating mode 206, and a flag indicating such is stored as data by at least one of first controller 134 and second controller 136. Step 502 includes opening second switch 122 and closing first switch 116. Further, in the alternative embodiment, method 500 includes a step 504 during which second measuring device 124 acquires second measurement 132 including, without limitation, the value of electric power drawn by load dissipative device 112 from motor-generator 106, i.e., $P_{load\ bank}$, and stores second measurement 132 as data in at least one of first computer-readable media 126 and second computer-readable media 128.

Also, in the alternative embodiment, method 500 includes a step 506, during which at least one of first controller 134 and second controller 136 compares second measurement 132 with second set point value, i.e., $X_2$, for electrical power drawn by load dissipative device 112 from motor-generator 106, i.e., $P_{load\ bank}$. Prior to step 506, at least one user-defined value of $X_2$ is stored as data in at least one of first computer-readable media 126 and second computer-readable media 128. Also during step 506, a result of comparing second measurement 132 with $X_2$ facilitates a determination by at least one of first controller 134 and second controller 136 as to whether or not turbomachine complex 102 shall remain in generating mode 206. Further, in the alternative embodiment, if second measurement 132 is not less than $X_2$, then turbomachine complex 102 remains in generating mode 206 and method 500 loops between step 504 and step 506.

Further, in the alternative embodiment, if second measurement 132 is less than $X_2$, then method 500 moves to a step 508, during which generating mode 206 is ended and a flag indicating such is stored as data by at least one of first controller 134 and second controller 136. After step 508, method 500 moves to a step 510, during which turbomachine complex 102 enters transitioning mode 204 and a flag indicating such is stored as data by at least one of first controller 134 and second controller 136. Method 500 then moves to a step 512, during which second switch 122 is closed. Furthermore, in the alternative embodiment, method 500 includes a step 514, during which first measuring device 123 acquires first measurement 130 including, without limitation, the value of electric power drawn from power source 118 by motor-generator 106, i.e., $P_{source}$, and stores first measurement 130 as data in at least one of first computer-readable media 126 and second computer-readable media 128.

Furthermore, in the alternative embodiment, method 500 includes a step 516, during which at least one of first controller 134 and second controller 136 subtracts second measurement 132 from first measurement 130, then compares a result thereof, i.e., $(P_{source}-P_{load\ bank})$, with first set point value, i.e., $X_1$. $X_1$ is a user-defined, i.e., predetermined, value for electrical power drawn from motor-generator 106 from power source 118, i.e., $P_{source}$. Prior to step 516, $X_1$ is stored as data in at least one of first computer-readable media 126 and second computer-readable media 128. Also during step 516, a result of comparing $(P_{source}-P_{load\ bank})$ with $X_1$ facilitates a determination by at least one of first controller 134 and second controller 136 as to whether or not turbomachine complex 102 shall remain in transitioning mode 204. Further, in the alternative embodiment, if $(P_{source}-P_{load\ bank})$ is not greater than $X_1$, then turbomachine complex 102 remains in transitioning mode 204 and method 500 loops between step 514 and step 516.

Moreover, in the alternative embodiment, if $(P_{source}-P_{load\ bank})$ is greater than $X_1$, then method 500 moves to a step 518, during which transitioning mode 204 is ended and a flag indicating such is stored as data by at least one of first controller 134 and second controller 136. After step 518, method 500 moves to a step 520, during which turbomachine complex 102 enters motoring mode 202 and a flag indicating such is stored as data by at least one of first controller 134 and second controller 136. Method 500 then moves to a step 522, during which first switch 116 is opened. In other alternative embodiments, step 522 further includes clearing all flags stored as data by at least one of first controller 134 and second controller 136. After completing step 522, method 500 enters a "finish" state 524 during which method 500 is completed. "Finish" state 524 includes, without limitation, a state at which shaft 110 has reached a magnitude of rotational velocity which is insufficient for operation of turbomachine complex 102 as a generator, as would be the case during a shutdown process. In still other alternative embodiments, method 500 includes additional method steps for a motor controller, not shown, to attain and maintain a set point speed for motor-generator 106 operating as a motor during motoring mode 202. In those other alternative embodiments, motor controller, including, without limitation, second controller 136, adjusts a power flow to motor-generator 106 operating as a motor to maintain the set point speed. Further, in those other alternative embodiments, it is possible for method 500 to measure, i.e., read, and react to other turbomachine complex 102 control parameters, including, without limitation, turbine cycle parameters such as turbine inlet temperature, that affect the power generated by the turbine during generating mode 206.

The above-described embodiments of turbomachine complexes and associated control systems and methods are suited to smooth the transition of motor-generators of turbomachines from motor operation to generator operation. The above-described embodiments of turbomachine complexes and associated control systems and methods are also suited to smooth the transition of motor-generators of turbomachines from generator operation to motor operation. Also, the above-described embodiments of turbomachine complexes and associated control systems and methods effectively prevent establishment of problematic forced oscillations in turbomachine systems resulting from the motor-generator transitioning to and from operation as a motor and as a generator. Further, the above-described embodiments of turbomachine complexes and associated control systems and methods effectively prevent decreasing compressor and working fluid pressure during the aforementioned transition states of motor-generators in turbomachine complexes used for electricity generation. Furthermore, the above-described embodiments of turbomachine complexes and associated control systems and methods facilitate faster transitioning to and from motor operation and generator operation of motor-generators of turbomachine complexes. Moreover, the above-described embodiments of turbomachine complexes and associated control systems and methods facilitate more effective and efficient utilization of lighter weight turbocompressors with less mechanical inertia in turbomachine complexes for electricity generation applications.

An exemplary technical effect of the above-described turbomachine complexes and associated control systems and methods includes at least one of the following: (a) smoothing the transition of motor-generators of turbomachines from motor operation to generator operation; (b) smoothing the transition of motor-generators of turbomachines from generator operation to motor operation; (c) preventing establishment of problematic forced oscillations in turbomachine systems resulting from the motor-generator transitioning to and from operation as a motor and as a generator; (d) preventing decreasing compressor and working fluid pressure during the aforementioned transition states of motor-generators in turbomachine complexes used for electricity generation; (e) facilitating faster transitioning to and from motor operation and generator operation of motor-generators of turbomachine complexes; and (f) facilitating more effective and efficient utilization of lighter weight turbocompressors with less mechanical inertia in turbomachine complexes for electricity generation applications.

Exemplary embodiments of methods, systems, and apparatus for the turbomachine complexes and associated control systems and methods are not limited to the specific embodiments described herein, but rather, components of systems and/or steps of the methods may be utilized independently and separately from other components and/or steps described herein. For example, the methods, systems, and apparatus may also be used in combination with other systems requiring smoothing of the transition between motor operation and generator operation including, without limitation, motor-generators driven by means other than turbomachines, and the associated methods, and are not limited to practice with only the systems and methods as described herein. Rather, the exemplary embodiments can be implemented and utilized in connection with many other applications, equipment, and systems that may benefit from using the above-described embodiments of turbomachine complexes and associated control systems and methods to improve the effectiveness and efficiency of operation for turbomachine complexes and other related systems in various applications.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processing (DSP) device, and/or any other circuit or processing device capable of executing the functions described herein. The methods described herein may be encoded as executable instructions embodied in a computer-readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A turbomachine complex comprising:
   at least one motor-generator;
   at least one power source coupled to said at least one motor-generator;
   at least one load dissipative device coupled to said at least one motor-generator, said turbomachine complex configured to energize said at least one motor-generator through said at least one power source, said turbomachine complex further configured to simultaneously energize said at least one load dissipative device through said at least one motor-generator;
   at least one first switch complex coupled to and between said at least one load dissipative device and said at least one motor-generator, said at least one first switch complex comprises at least one first switch, at least one first measuring device coupled to at least one of said turbomachine complex and said at least one power source, and at least one first controller coupled to and between said at least one first switch and said at least one first measuring device, wherein said first switch is configured to alternately open and close to facilitate a first regulated electrical power flow from said at least one motor-generator to said at least one load dissipative device: and
   at least one second switch complex coupled to and between said at least one power source and said at least one motor-generator, said at least one second switch complex comprises at least one second switch, at least one second measuring device coupled to at least one of said turbomachine complex and said at least one load dissipative device, and at least one second controller coupled to and between said at least one second switch and said at least one second measuring device, wherein said second switch is configured to alternately open and close to facilitate a second regulated electrical power flow from said at least one power source to said at least one motor-generator.

2. The turbomachine complex in accordance with claim 1, wherein:
   said at least one power source configured to supply an amount of electrical power to said at least one motor-generator to facilitate a motorized operation of said at least one motor-generator; and
   said at least one load dissipative device configured to dissipate electrical power from said at least one motor-generator to facilitate operation of said at least one motor-generator as a generator.

3. The turbomachine complex in accordance with claim 1, wherein:
   said at least one first switch complex further comprises at least one first computer-readable media coupled to and between said at least one first measuring device and said at least one first controller, said at least one first switch complex configured to receive and store at least one user-defined value of at least one of at least one first set point and at least one second set point as data in said at least one first computer-readable media; and said at least one first measuring device further coupled to and between said at least one power source and said at least one first computer-readable media, said at least one first measuring device configured to acquire at least one first measurement of at least one measurand associated with at least one of said turbomachine complex and said at least one power source, and store said at least one first measurement thereof as data in said at least one first computer-readable media.

4. The turbomachine complex in accordance with claim 1, wherein:

said at least one second switch complex further comprises a second computer-readable media coupled to and between said at least one second measuring device and said at least one second controller, said at least one second switch complex configured to receive and store at least one user-defined value of at least one of at least one first set point and at least one second set point as data in at least one second computer-readable media; and said at least one second measuring device further coupled to and between said at least one load dissipative device and said at least one second computer-readable media, said at least one second measuring device configured to acquire at least one second measurement of at least one measurand associated with at least one of said turbomachine complex and said at least one load dissipative device, and store said at least one second measurement thereof as data in said at least one second computer-readable media.

5. The turbomachine complex in accordance with claim 1, wherein said at least one first controller is further coupled to said at least one second controller, said at least one first controller and said at least one second controller configured to facilitate transfer of information to and between said at least one first controller and said at least one second controller.

6. The turbomachine complex in accordance with claim 1, wherein said at least one first controller and said at least one second controller configured to perform at least one of:

compare said at least one first measurement to at least one user-defined value of at least one first set point;

compare said at least one second measurement to at least one user-defined value of at least one second set point;

transmit at least one first switch control signal to open said at least one first switch when the at least one first measurement has a first predetermined value and close said at least one first switch when the at least one first measurement has a second predetermined value different from the first predetermined value; and transmit at least one second switch control signal to open said at least one second switch when the at least one second measurement has a first predetermined value and close said at least one second switch when the at least one second measurement has a second predetermined value different from the first predetermined value.

7. The turbomachine complex in accordance with claim 1, said at least one first controller and said at least one second controller configured to perform at least one of:

compare said at least one first measurement to at least one user-defined value of at least one first set point;

compare said at least one second measurement to at least one user-defined value of at least one second set point;

transmit at least one of at least one first switch control signal, at least one first cross-controller signal, and at least one second cross-controller signal to said at least one first switch, said at least one first switch control signal, said at least one first cross-controller signal, and said at least one second cross-controller signal configured to open said at least one first switch when the at least one first measurement has a first predetermined value and close said at least one first switch when the at least one first measurement has a second predetermined value different from the first predetermined value; and transmit at least one of at least one second switch control signal, at least one first cross-controller, and at least one second cross-controller signal to said at least one second switch, said at least one second switch control signal, said at least one first cross-controller signal, and said at least one second cross-controller signal configured to open said at least one second switch when the at least one second measurement has a first predetermined value and close said at least one second switch when the at least one second measurement has a second predetermined value different from the first predetermined value.

8. A method of operating a turbomachine complex including at least one motor-generator, said method comprising:

coupling at least one power source and at least one load dissipative device to the at least one motor-generator;

energizing said at least one motor-generator through said at least one power source, and simultaneously energizing said at least one load dissipative device through said at least one motor-generator;

acquiring at least one measurement of at least one measurand associated with at least one of the turbomachine complex, said at least one power source, and said at least one load dissipative device;

determining a present operational state in which the turbomachine complex operates, the present operational state selected from one of at least two operational states;

alternately transitioning to and from each of said at least two operational states based on at least one result of determining the present operational state;

coupling at least one first switch complex to and between said at least one load dissipative device and said at least one motor-generator, the first switch complex including at least one first switch, at least one first measuring device, at least one first computer-readable media, and at least one first controller;

coupling at least one second switch complex to and between said at least one power source and said at least one motor-generator, the second switch complex including at least one second switch, at least one second measuring device, at least one second computer-readable media, and at least one second controller; and receiving at least one user-defined value of at least one first set point and at least one second set point, said at least one user-defined value including a value of at least one of a power, a current, a voltage, a resistance, a frequency, a phase, and an impedance associated with at least one of said at least one power source and said at least one load dissipative device.

9. The method in accordance with claim 8, further comprising coupling said at least one first controller to said at least one second controller.

10. The method in accordance with claim 8, further comprising:

coupling at least one first computer-readable media to said at least one first switch complex; and
coupling at least one second computer-readable media to said at least one second switch complex, wherein receiving at least one user-defined value of at least one first set point and at least one second set point comprises storing said at least one user-defined value as data in at least one of the first computer-readable media and said at least one second computer-readable media.

11. The method in accordance with claim 8, wherein:
coupling at least one first switch complex to and between said at least one load dissipative device and said at least one motor-generator comprises coupling said at least one first measuring device to said at least one power source;
coupling at least one second switch complex to and between said at least one power source and said at least one motor-generator comprises coupling said at least one second measuring device to said at least one load dissipative device; and
acquiring at least one measurement of at least one measurand associated with at least one of the turbomachine complex, said at least one power source, and said at least one load dissipative device including at least one of:
acquiring at least one first measurement of at least one measurand associated with at least one of said at least one motor-generator and said at least one power source; and
acquiring at least one second measurement of at least one measurand associated with at least one of said at least one motor-generator and said at least one load dissipative device.

12. The method in accordance with claim 11, wherein:
acquiring at least one first measurement of at least one measurand associated with at least one of said at least one motor-generator and said at least one power source comprises storing at least one value of said at least one first measurement as data in at least one of the first computer-readable media and said at least one second computer-readable media; and
acquiring at least one second measurement of at least one measurand associated with at least one of said at least one motor-generator and said at least one load dissipative device comprises storing at least one value of said at least one second measurement as data in at least one of the first computer-readable media and said at least one second computer-readable media.

13. The method in accordance with claim 11, wherein determining a present operational state in which the turbomachine complex operates comprises at least one of:
comparing said at least one user-defined value of said at least one first set point to the value of said at least one first measurement;
subtracting said at least one first measurement from said at least one second measurement and comparing a result of subtracting said at least one first measurement from said at least one second measurement to said at least one user-defined value of said at least one second set point;
comparing said at least one user-defined value of said at least one second set point to the value of said at least one second measurement; and
subtracting said at least one second measurement from said at least one first measurement and comparing a result of subtracting said at least one second measurement from said at least one first measurement to said at least one user-defined value of said at least one first set point, wherein said at least two operational states include a motoring mode and a generating mode, wherein alternately transitioning to and from said at least two operational states based on at least one result of determining the present operational state comprises alternately opening and closing said at least one first switch and said at least one second switch to facilitate at least one of:
transmitting a first regulated electrical power flow from said at least one power source to said at least one motor-generator; and
transmitting a second regulated electrical power flow from said at least one motor-generator to said at least one load dissipative device.

14. The method in accordance with claim 13, wherein said at least two operational states further include a transitioning mode, wherein alternately transitioning to and from said at least two operational states based on at least one result of determining the present operational state further comprises proceeding sequentially from the motoring mode to the transitioning mode to the generating mode.

15. The method in accordance with claim 14, wherein alternately opening and closing said at least one first switch and said at least one second switch comprises:
remaining in motoring mode by keeping said at least one first switch open and said at least one second switch closed when the at least one value of said at least one first measurement is not less than said at least one user-defined value of said at least one first set point;
exiting motoring mode and entering transitioning mode by keeping said at least one second switch closed and closing said at least one first switch when the at least one value of said at least one first measurement is less than said at least one user-defined value of said at least one first set point;
remaining in transitioning mode by keeping both of said at least one first switch and said at least one second switch closed when the result of subtracting said at least one first measurement from said at least one second measurement is not greater than said at least one user-defined value of said at least one second set point; and
exiting transitioning mode and entering generating mode by keeping said at least one first switch closed and opening said at least one second switch when the result of subtracting said at least one first measurement from said at least one second measurement is greater than said at least one user-defined value of said at least one second set point.

16. The method in accordance with claim 13, wherein said at least two operational states further include a transitioning mode, wherein alternately transitioning to and from said at least two operational states based on at least one result of determining the present operational state further comprises proceeding sequentially from the generating mode to the transitioning mode to the motoring mode.

17. The method in accordance with claim 16, wherein alternately opening and closing said at least one first switch and said at least one second switch comprises:
remaining in generating mode by keeping said at least one first switch closed and said at least one second switch open when the at least one value of said at least one second measurement is not less than said at least one user-defined value of said at least one second set point;
exiting generating mode and entering transitioning mode by keeping said at least one first switch closed and closing said at least one second switch when the at least one value of said at least one second measurement is less than said at least one user-defined value of said at least one second set point;

remaining in transitioning mode by keeping both of said at least one first switch and said at least one second switch closed when the result of subtracting said at least one second measurement from said at least one first measurement to said at least one user-defined value of said at least one first set point is not greater than said at least one user-defined value of said at least one first set point; and exiting transitioning mode and entering motoring mode by keeping said at least one second switch closed and opening said at least one first switch when the result of subtracting said at least one second measurement from said at least one first measurement to said at least one user-defined value of said at least one first set point is greater than said at least one user-defined value of said at least one first set point.

* * * * *